Dec. 30, 1958     F. J. KAEHNI     2,866,839
IGNITION SYSTEMS FOR INTERNAL COMBUSTION ENGINES
Filed Aug. 1, 1957     2 Sheets-Sheet 1

INVENTOR.
Frank J. Kaehni
BY Webb, Mackey & Burden
HIS ATTORNEYS

Dec. 30, 1958  F. J. KAEHNI  2,866,839
IGNITION SYSTEMS FOR INTERNAL COMBUSTION ENGINES
Filed Aug. 1, 1957  2 Sheets-Sheet 2

INVENTOR.
Frank J. Kaehni
BY Webb, Mackey & Burden
HIS ATTORNEYS

United States Patent Office 2,866,839
Patented Dec. 30, 1958

2,866,839

IGNITION SYSTEMS FOR INTERNAL COMBUSTION ENGINES

Frank J. Kaehni, Cleveland, Ohio, assignor to Economy Engine Company, Youngstown, Ohio, a corporation of Ohio Application August 1, 1957, Serial No. 675,652

38 Claims. (Cl. 123—148)

The present invention relates generally to internal combustion engines and, more particularly, to ignition systems for such engines. It provides a materially simplified ignition system and, at the same time, overcomes many of the known objectionable operating characteristics of such engines and eliminates some of the mechanical requirements for them.

This application is a continuation-in-part of my copending application, Serial No. 567,777, filed February 27, 1956.

Heretofore, many efforts have been made to improve internal combustion engines and the ignition systems therefor. Various automatic mechanisms have been devised for the purpose of supplying to the points of ignition a properly timed spark so as to ignite the combustible mixture in the cylinders at such time as to cause the engine to deliver the maximum power output per unit of fuel supplied to the engine. Despite the various improvements which have been made from time to time to ignition systems, the conventional system still remains in use, although somewhat more complicated than earlier conventional systems. The conventional system still in use requires timing mechanism, a distributor, automatic mechanism for adjusting the timing to suit operating conditions, and other auxiliary mechanism, in addition to the power source and spark plugs. Despite the improvements which have been made in ignition systems, carburetion systems and in the design of the cylinders, combustion is still inefficient at both low and high speeds. Additives of various types have been used in fuels in order to improve the combustion taking place in the cylinders, but, despite this and despite the other improvements which have been made, the combustion process in such engines remains inefficient.

The principal object of the present invention is to provide a simplified ignition system and a method of operation in which automatic timing is obtained without the use of the conventional timing apparatus. It is a further object of this invention to provide a system which results in more efficient and more complete combustion.

As indicated above, the conventional ignition system utilizes timing equipment and a single timed spark is provided in each cylinder for igniting the charge therein. In accordance with my invention, I provide a system in which ignition is obtained by means of a continuous spark which may be provided within a recess or ignition chamber communicating with the cylinder or adjacent a wall of the cylinder in the opening in which the spark plug is positioned. Where the continuous spark is formed in a recess, of course, a recess and at least one spark plug are provided for each of the cylinders.

The term "continuous spark" is employed herein to designate a series of individual sparks for each explosion of the engine. The continuous spark, in reality, may be continuous in the sense that a spark is maintained at the electrodes of each spark plug at all times during the operation of the engine, i. e., throughout the two cycles of a two-cycle engine or throughout the four cycles of a four-cycle engine. However, it is not necessary that the continuous spark function throughout each cycle. It is necessary, however, that a compact series of individual sparks be supplied for each explosion and, in order to accomplish this, the power source should supply the continuous spark throughout a substantial portion of the combined compression and power strokes of any specific cylinder. In my system, however, I prefer to maintain sparking at the electrodes of each of the spark plugs at all times and to maintain a sparking condition of such character that, when peak pressure is achieved in any given cylinder, a hot spark of sufficient intensity to ignite the compressed gases is present.

Various tests which I have made show the importance of taking into account the negative resistance characteristics of the sparks at the spark plug of an engine. The heavier the current at a spark plug the lower the voltage across the plug. I have found that a high voltage at the plug is necessary for good ignition and that this high voltage must remain on for an appreciable period of time longer than is possible with the timed system now employed. In the ordinary timed system, when the timing contacts are closed the magnetic flux in the core of the coil builds up and, when the timing contacts open the primary circuit of the coil, there is a rapid collapse of the magnetic flux, as a consequence of which the secondary current quickly reaches a peak and provides one short pulse of medium voltage current and then dies out to zero. Ignition must occur at the point of heaviest current and, with lean mixtures, this occurs at too low a voltage and the pulse is too short in duration. At high speeds, the period during which the timer points are closed is of extremely short duration and, as a consequence, at higher speeds an exceedingly weak spark is provided.

Sparks are oscillatory in nature and the frequency of the oscillations is dependent upon and due to the capacity and inductance present in the circuit. The resistance in the circuit, the reactance of the coil, the capacity of the wiring and like factors also affect the nature of the spark. With weak currents in the spark circuit, the intensity of the spark depends principally upon the gas through which the discharge takes place and, when heavy currents are employed, the electrodes are adversely affected. Even though the voltage at the secondary would reach a high value on an open circuit (i. e., with no plug connected), in actual operation the voltage pulse is comparatively low because of the heavy current concentrated in one pulse of current of short duration. Since there is only one pulse of current available in the timed spark system, it is necessary to use a heavy current pulse in order for the system to operate. And, as indicated above, the use of the heavy current pulse makes it impossible to operate with the desirable high voltages.

In my continuous spark system, many high voltage discharges in close succession of low current value are provided and, as a consequence, materially better ignition results, particularly for normal or lean mixtures. I employ current limiting means of relatively high resistance in series with each plug and, consequently, maintain a relatively low value current to each plug at all times. Each plug is provided with many peaks of high voltage for each explosion in the main combustion chamber. In my system, the spark voltage varies in accordance with the pressure prevailing at each plug and, consequently, is somewhat lower than peak voltage when the pressure is low, but the voltage rises as the pressure increases and many opportunities are provided for ignition of even a lean mixture if the first pulse fails to ignite the mixture due to vagaries thereof. Of course, frequency is an important factor in my continuous spark system and the frequency should be sufficiently high to produce many sparks per explosion rather than one spark, as in the regular timed system.

In the conventional timed system, the power at each plug is fixed for a given engine speed and becomes weaker as the engine speed increases. In my continuous spark system, however, the power at the plug varies during different portions of any one ignition cycle, depending upon gas pressure. During one combustion cycle, the voltage at the plug goes up as the piston moves toward the top dead center position and, during this compression stroke, there are a number of sparks taking place which are preferably within only a few degrees of each other. With a fixed ignition transformer secondary voltage, the current to the plugs, as well as the voltage will vary with the pressures in the cylinders. The overall voltage at the transformer, however, remains fairly constant. The voltage at the plug goes up as the pressure goes up and, since power is proportional to the voltage times the current, the power at each plug in my system generally increases as the pressure increases. The reason power at one plug can go up only when under pressure is because each plug circuit has a high resistance, capacitance or inductance in series with the plug and these act as equalizers of current to the several cylinders of the engine.

In my system, the relation of total voltage (secondary) to spark plug gap voltage must always be such that enough reserve voltage is available to maintain a continuous spark at the maximum pressure that is reached during the combustion cycle. Temperature also is a factor and the higher the temperature the lower the voltage because of the greater conductivity of a hot gas as compared with a colder gas.

The increase in pressure ahead of the top dead center position during the compression stroke increases the dielectric constant of the gas mixture and this makes it necessary that the voltage be of higher value or no spark will take place. There is also some change in the power factor of the circuit during each pressure cycle due to the high specific inductive capacity of gas under pressure as compared to normal atmospheric pressure or a partial vacuum, as on the intake stroke, or under only slight pressure during the exhaust stroke. Temperature variations in the gas also affect voltage, current and leakage or sparkover potentials at the plug. Cold gas under pressure requires more voltage for sparkover than when the gas is heated. Irrespective of the factors creating heat in the gas in the cylinder, enough voltage must be provided to maintain the spark under the highest temperature and pressure conditions encountered.

Where my continuous spark system is employed, utilizing one source of high voltage for all cylinders of an engine, the variations of voltages at the individual spark plugs occur in accordance with the above-mentioned pressure and temperature conditions, even though the secondary voltage of the transformer remains fairly constant. The resistors or capacitors which I provide in each plug circuit act as governors to maintain the required current at each plug; and the voltage at each plug varies in accordance with the pressure and temperature conditions so that, when the pressure in each cylinder increases, the power at each plug generally increases because of the increase in voltage.

It will be apparent from the above that the temperature and pressure conditions provide partial timing in the continuous spark system of the present invention. This timing is sufficient under many operating conditions, but, in addition, further automatic timing is obtained where the electrodes of the spark plugs are positioned within an ignition chamber or recess communicating with the main combustion chamber of each cylinder. In either case, i. e., irrespective of whether a recess or ignition chamber is provided, the provision of resistors, inductors or capacitors in the plug circuits in combination with a source providing a continuous spark for each cylinder makes it possible to completely eliminate the ordinary timing mechanism and the distributor, which are required in a timed spark system.

In accordance with the present invention, my ignition system comprises a spark plug having spaced electrodes for each of the cylinders of a multi-cylinder engine, a source of high potential current, a current limiting means for each spark plug, which is electrically connected to one of the electrodes of each plug, and connecting means for connecting the source of high potential current to each of the current limiting means. Connections are also provided for appropriately grounding the parts of the system, including the one electrode of each plug.

My invention also contemplates the use of a recess or ignition chamber if desired. The recess or ignition chamber is in communication with the combustion chamber of a cylinder and the spaced electrodes of the plug are positioned in the recess or ignition chamber. The recess or ignition chamber may be formed separately from the combustion chamber or it may be formed by shaping the upper portion of the cylinder wall or by the use of a deeply recessed spark plug.

In the accompanying drawings I have shown, for purposes of illustration only, several embodiments of my invention. In the drawings.

Figure 1:
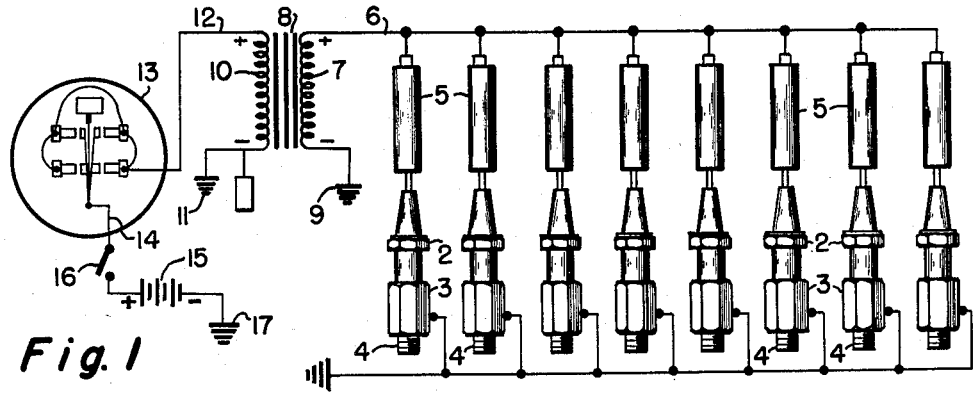
Figure 1 shows a direct current ignition system employing a vibrator in the primary circuit of an ignition coil, resistors and the recesses or ignition chambers.

Referring first to Figure 1, which illustrates the system for an eight cylinder engine, there is a spark plug 2 for each of the eight cylinders and each plug is provided with the usual spaced electrodes. Each plug is mounted in conjunction with an ignition chamber 3 so that the plug points are positioned within the ignition chamber. The other end of each ignition chamber, i. e., the end opposite the end on which the plug is mounted, is provided with threads 4 so as to permit it to be mounted in an appropriate opening in the cylinder wall so that each ignition chamber will be in communication with the combustion chamber of the cylinder on which it is mounted. One electrode of each plug is connected to a resistor 5 which may be of any suitable value, for example, 10 or 20 megohms. One terminal of each resistor is connected to a lead 6, which, in turn, is connected to the one end of the secondary 7 of the spark or ignition coil 8. The other end of the secondary 7 is connected to ground, as illustrated at 9, and, of course, the one electrode of each plug is grounded in the usual manner through the engine. The primary 10 of the spark or ignition coil 8 has one end connected to ground, as indicated at 11, and the other end thereof is connected by a lead 12 to one side of a vibrator 13. The other side of the vibrator is connected by means of a lead 14 to a battery 15 through an ignition switch 16. The other side of the battery is grounded, as indicated at 17. In this system, the battery, vibrator and coil constitute the source of high voltage current which is supplied to each of the plugs through the resistors 5. These resistors function as current limiters and prevent the high voltage pulses from being concentrated in any one plug circuit at all times. In this direct current system, the vibrator interrupts the current flow to the primary repeatedly and the magnetic flux in the coil builds up and then collapses sending repeated high potential pulses through the secondary and to the plug circuits.

Figure 2:
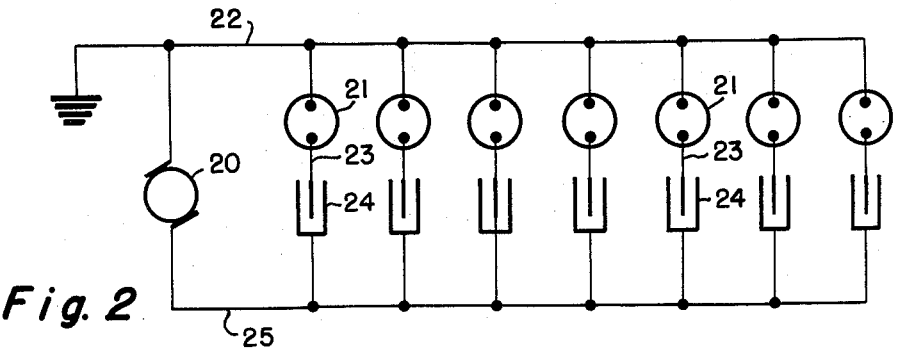
Figure 2 illustrates a somewhat different system employing an alternating current generator and capacitors in the plug circuits.

In the system illustrated in Figure 2, the power source is shown as an alternating current generator 20. One electrode of each plug 21 is connected to a lead 22, which is connected to one side of the generator. The other electrode of each plug is connected by a lead 23 to a capacitance or inductance 24 and the other side of each capacitance or inductance is connected by a lead 25 to a lead which is connected to the other side of the source of high potential alternating current. In this system resistors may be used instead of the capacitances and the power source may be a high voltage alternator directly connected to the resistors or capacitors without the use of a transformer.

Figure 3:
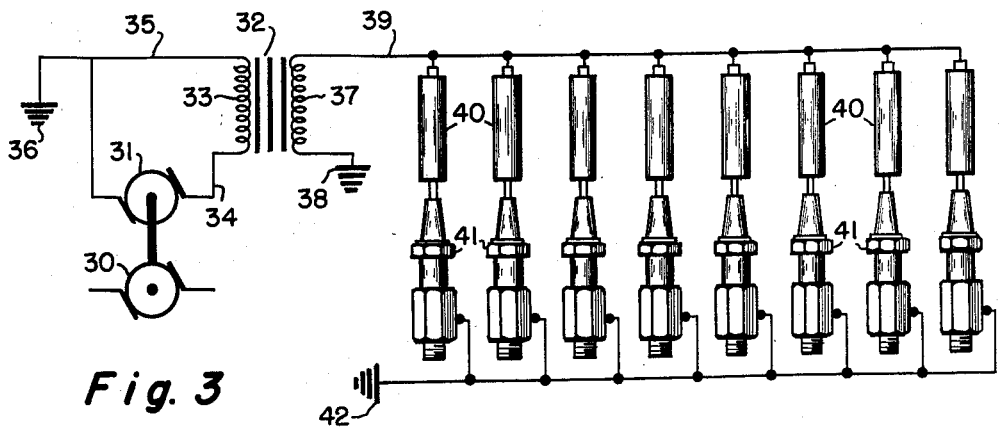
Figure 3 shows a further modification employing a motor generator as the source of alternating current, resistors in the plug circuits and a transformer or ignition coil for stepping up the voltage to the desired level.

In the system shown in Figure 3, the power source comprises the motor 30, the alternating current generator 31, which is tied to the motor, and the transformer or coil 32. The generator is connected to the primary 33 of the transformer or coil 32 by leads 34 and 35. The other side of the generator is also grounded, as illustrated at 36. The secondary 37 of the coil 32 has one side grounded, as indicated at 38, and the other side is connected by a lead 39 to each resistor 40 and the other side of each resistor is connected to one electrode of a plug 41. The other electrode of each plug is connected to ground, as indicated at 42.

Figure 4:
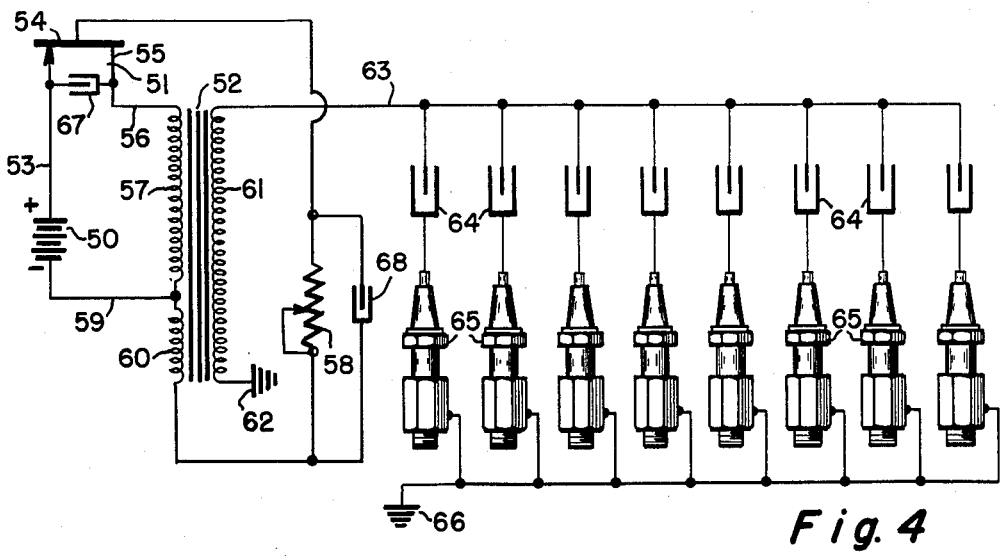
Figure 4 shows a further modification embodying a transistor in the primary circuit of the coil.

In the system shown in Figure 4, the power source comprises a battery 50, a transistor indicated generally by the reference character 51 and a transformer or coil indicated generally by the reference character 52. In this system, the positive terminal of the battery is connected by lead 53 to the emitter 54 of the transistor. The current flows through the emitter to the collector 55 and thence, by means of the connection 56, to the one side of the one primary winding 57. The current rapidly reaches its maximum value, depending upon the base bias current setting of the resistor 58 and the fact that the voltage on the base terminal of the transistor is negative in respect to the emitter. The other side of the one primary coil 57 is connected by a lead 59 to the negative terminal of the battery and it is also connected to one end of a control winding 60 in the primary circuit. The other side of this control winding is connected to the resistor 58. When the magnetic flux in the core has reached its maximum value, the flux change becomes zero and the induced voltages in the windings are zero. This causes the base bias current from the winding 60 to begin to reverse and start the negative or cut-off portion of the current cycle. With a decreasing flux in the core of the coil or transformer 52, reverse voltages are induced and this rapid collapse of flux in the core produces the high peak voltages in the secondary 61 which produce the rapid recurring sparks at the spark plugs. One side of this secondary is connected to ground, as indicated at 62 and the other side is connected by a lead 63 to one side of a capacitance 64 in each of the plug circuits. The other side of each capacitance is connected to the one electrode of each plug 65 and the other electrode of each plug is grounded, as indicated at 66. A capacitor 67 is included in the transistor circuit to protect the transistor against excessive voltages. An additional capacitor 68 is included in the circuit as a protective measure.

In this circuit, the transistor acts like a switch between the battery 50 and the primary winding of the transformer or coil. When the base of the transistor is negative in respect to the emitter, the circuit is closed and current flows. When the base voltage polarity reverses and becomes positive in respect to the emitter, the circuit opens and the flux collapses in the same manner as it does in a vibrator circuit when the contacts are open. The transistor interrupts the circuit at a relatively high frequency, depending upon the magnetic properties of the transformer core, its size, the number of turns of the windings, their leakage, reactance and the values of the capacitances 67 and 68. The battery voltage also affects both frequency and power.

Figure 5:
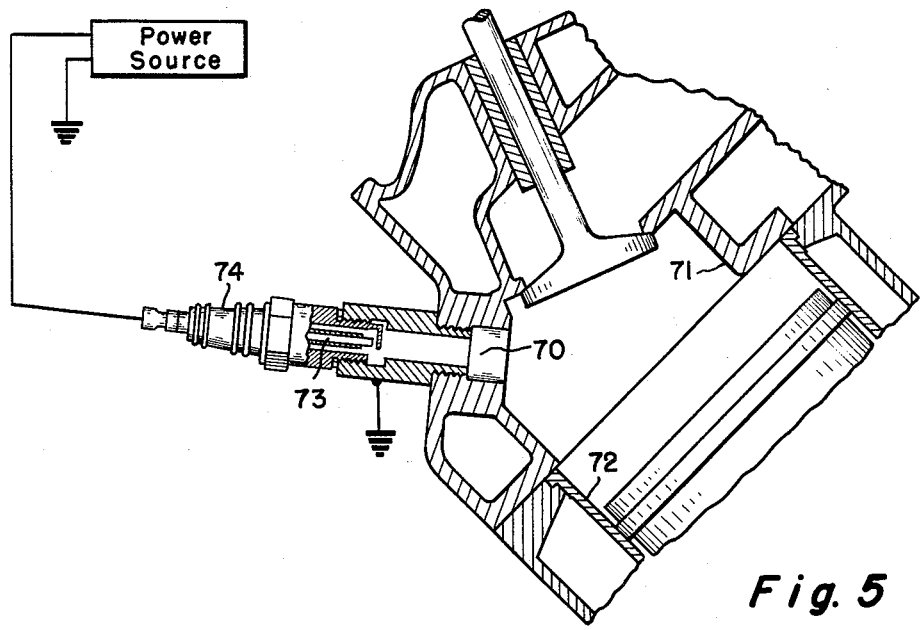
Figure 5 is a view illustrating the relationship between the plug, ignition chamber and main combustion chamber of each cylinder.

In Figure 5, I have illustrated the relationship between the cylinder, ignition chamber and spark plugs. As shown in this view, the recess or ignition chamber 70 is in communication with the main combustion chamber 71 of the cylinder 72. The center electrode 73 of the plug 74 is positioned in the recess adjacent the other electrode and at a point spaced from the main combustion chamber. If desired a wall of the recess may be used as an electrode.

In any of the systems illustrated in the drawings, a continuous spark is supplied to each of the plugs of the engine and, as the pressure builds up in each cylinder, sufficient voltage is present to cause a series of high voltage sparks to occur at or about the time when the pressure reaches a maximum. By reason of the conditions explained above, automatic timing is obtained, as a consequence of which it is possible to dispense with the usual timing mechanism and distributor.

The term "cylinder" is used herein to designate the entire cylinder, including that portion of the cylinder above the piston which constitutes the combustion chamber and also that portion of the combustion chamber which, strictly speaking, may be considered as being in the head.

The term "combustion chamber" is used herein to designate the space in the cylinder above the piston where burning takes place and the space adjacent thereto which, strictly speaking, is in the head.

The term "ignition chamber" is used herein to designate the recess or space in which the sparking electrodes are mounted and which is in communication with the combustion chamber. As indicated earlier, it may be separately formed in any of the ways described or it may be specially formed as a part of the head in such manner as to provide a discreet chamber which, nevertheless, is in communication with the combustion chamber.

While I have shown and described several embodiments of this invention, it will be understood that they are illustrative only and that my invention may be embodied otherwise within the scope of the appended claims.

I claim:

1. An ignition system for an internal combustion engine having a plurality of cylinders providing a plurality of combustion chambers, comprising an ignition chamber for each cylinder, each ignition chamber communicating with the combustion chamber of a cylinder, a pair of spaced electrodes within each ignition chamber and spaced from the communicating combustion chamber, a current limiting means for each pair of electrodes, each of said current limiting means being connected in series relationship with a pair of electrodes, each pair of electrodes and its current limiting means being connected in parallel relationship in respect of the other pairs of electrodes and current limiting means, and a source of high potential current connected to said parallel arrangement of current limiting means for continuously supplying current impulses of high frequency and high voltage thereto and to said electrodes.

2. An ignition system as claimed in claim 1 in which each current limiting means is a resistor.

3. An ignition system as claimed in claim 1 in which each current limiting means is an inductor.

4. An ignition system as claimed in claim 1 in which each current limiting means is a capacitance.

5. An ignition system as claimed in claim 1 in which the source of high potential current includes a step-up transformer and means for interrupting the current supplied thereto.

6. An ignition system as claimed in claim 1 in which the source of high potential current includes a step-up transformer.

7. An ignition system as claimed in claim 1 in which the source of high potential current includes an alternator.

8. An ignition system as claimed in claim 1 in which the source of high potential current includes an induction coil and means for intermittently interrupting the current supplied thereto.

9. An ignition system as claimed in claim 1 in which the source of high potential current includes a step-up transformer and a source of alternating current.

10. An ignition system as claimed in claim 1 in which the source of high potential current includes a transistor.

11. An ignition system as claimed in claim 1 in which the source of high potential current includes a transistor and a step-up transformer.

12. An ignition system as claimed in claim 1 in which one side of the source of high potential current is grounded and one electrode of each pair is grounded.

13. An ignition system for an internal combustion engine having at least one cylinder providing a main combustion chamber, comprising an ignition chamber communicating at one end thereof with the combustion chamber of said cylinder, said ignition chamber being so constructed and arranged as to provide ready ingress and egress of gases thereto and therefrom, spaced electrodes within said ignition chamber and spaced from the communicating combustion chamber of the cylinder, current limiting means of relatively high impedance value connected in series with one of said electrodes, the other of said electrodes being grounded, and a source of high potential current connected to said current limiting means and adapted to provide a continuous spark at said electrodes, said current limiting means being of sufficient size electrically to limit the current to said electrodes to a sufficiently low value to prevent substantial electrode erosion.

14. An ignition system as claimed in claim 13 in which the source of high potential current includes a step-up transformer and means for interrupting the current supplied thereto.

15. An ignition system as claimed in claim 13 in which the source of high potential current includes a source of alternating current.

16. An ignition system as claimed in claim 13 in which the source of high potential current includes a source of alternating current and a step-up transformer.

17. An ignition system as claimed in claim 13 in which the source of high potential current includes a transistor.

18. An ignition system as claimed in claim 13 in which the current limiting means is a resistor of high resistance.

19. An ignition system as claimed in claim 13 in which the current limiting means is a capacitance.

20. An ignition system for an internal combustion engine having a plurality of cylinders providing a plurality of combustion chambers, comprising an ignition chamber for each cylinder, each ignition chamber communicating with the combustion chamber of a cylinder, a pair of spaced electrodes within each ignition chamber and spaced from the communicating combustion chamber, and means, including current limiting means, for substantially continuously supplying current impulses of high voltage to each of said pairs of electrodes, said current limiting means being of sufficient size electrically to divide the current between said pairs of electrodes so as to assure continuous sparking at each pair of electrodes.

21. An ignition system for an internal combustion engine having a plurality of cylinders providing a plurality of combustion chambers, comprising an ignition chamber for each cylinder, each ignition chamber communicating with the combustion chamber of a cylinder, a pair of spaced electrodes within each ignition chamber and spaced from the communicating combustion chamber, and means, including current limiting means, electrically connected with said pairs of electrodes adapted and arranged to provide a continuous spark at each of said pairs of electrodes during substantially all of each operating cycle, said current limiting means being of sufficient size electrically to assure continuous sparking at each pair of electrodes.

22. An ignition system for an internal combustion engine having a plurality of cylinders providing a plurality of combustion chambers, comprising an ignition chamber for each cylinder, each ignition chamber communicating with the combustion chamber of a cylinder, said ignition chamber being so constructed and arranged as to provide ready ingress and egress of gases passing into and from said ignition chamber, a pair of spaced electrodes within each ignition chamber and spaced from the communicating combustion chamber, and means for continuously and simultaneously supplying to each of said pairs of electrodes current impulses of high frequency and high voltage, said means including current limiting means adapted, arranged and of sufficient size electrically to assure continuous sparking simultaneously at each pair of electrodes.

23. An ignition system for an internal combustion engine having a plurality of cylinders providing a plurality of combustion chambers, comprising a spark plug having spaced electrodes for each cylinder, an ignition chamber for each cylinder, one end of each ignition chamber communicating with the combustion chamber of a cylinder, and the other end being adapted to receive a spark plug with the electrodes positioned within the ignition chamber and spaced from the combustion chamber of the cylinder, the ignition and combustion chambers being so constructed and arranged as to provide ready ingress and egress of gases into and out of the ignition chamber, a source of high potential current adapted and arranged to provide continuously current impulses of relatively high frequency, a current limiting means for each spark plug electrically connected in series to one of said electrodes of each spark plug, and means for connecting said source of high potential current to said current limiting means with all of said current limiting means and their respective spark plugs in parallel.

24. An ignition system for an internal combustion engine having a plurality of cylinders, comprising a pair of spaced electrodes for each cylinder, a source of high potential current, a current limiting means for each pair of electrodes electrically connected in series to one of the electrodes of a pair, and means for connecting all of said pairs of electrodes and their individual current limiting means in parallel to said source of high potential current, said source of high potential current and said current limiting means being adapted to provide simultaneously a continuous spark discharge at each of said pairs of electrodes.

25. An ignition system for an internal combustion engine having a plurality of cylinders providing a plurality of combustion chambers, comprising a pair of spaced electrodes for each combustion chamber, each pair being positioned so as to be operative to fire gases in the combustion chamber with which it cooperates, a single source of electrical current for a plurality of pairs of electrodes, and means connected with said source and with said pairs of electrodes for providing simultaneously a continuous high potential spark discharge at each of said pairs of electrodes, said last-mentioned means including current limiting means of sufficient size electrically to divide the current between the pairs of electrodes and to assure continuous and simultaneous sparking at each of said pairs of electrodes.

26. An ignition system for an internal combustion engine having a plurality of cylinders, comprising a spark plug having spaced electrodes for each cylinder, a coil having primary and secondary windings, means for connecting one side of said secondary winding to an electrode of each of said spark plugs with said spark plugs in parallel with each other, said connecting means including a current limiting means in the electrical circuit to each of said spark plugs, whereby said current limiting means are arranged in parallel, and means for continuously supplying high frequency current impulses to the primary winding of said coil.

27. An ignition system for an internal combustion engine having a plurality of cylinders providing a plurality of combustion chambers, comprising a spark plug having spaced electrodes for each cylinder, an ignition chamber for each cylinder, one end of each ignition chamber communicating with the combustion chamber of a cylinder and the other end being adapted to receive a spark plug with the electrodes positioned within the ignition chamber and spaced from the combustion chamber of its cylinder, a coil having primary and secondary windings, connecting means for connecting one side of said secondary winding to an electrode of each of said spark plugs with the spark plugs arranged in parallel, said connecting means including a current limiting means in the electrical circuit to each of said spark plugs, and means for supplying high frequency current impulses to the primary winding of said coil.

28. An ignition system for an internal combustion engine having a plurality of cylinders providing a plurality of combustion chambers, comprising an ignition chamber for each cylinder, each ignition chamber communicating with the combustion chamber of a cylinder, a pair of spaced electrodes within each ignition chamber, a power source common to all of said pairs of electrodes and electrical connections between said power source and said electrodes for continuously supplying high frequency, high potential current impulses to each of said pairs of electrodes, whereby sparking is substantially continuously maintained at each of said pairs of electrodes, and means included in said connections for limiting current flow to each of said pairs of electrodes.

29. A method of operating an internal combustion engine having a plurality of cylinders providing a plurality of combustion chambers, a pair of electrodes for each combustion chamber and a source of high potential current common to each of said pairs of electrodes, the steps comprising providing and maintaining a continuous series of current impulses of high voltage at each of said pairs of electrodes and limiting the current flow to each of said pairs of electrodes to a value which will prevent conditions at one pair of electrodes from adversely affecting sparking conditions at the other pairs.

30. A method of operating an internal combustion engine having a plurality of cylinders providing a plurality of combustion chambers and a pair of electrodes for each combustion chamber, the steps comprising continuously supplying from a common high potential source current impulses of high frequency and high voltage to each of said pairs of electrodes, maintaining sparking conditions at each pair of electrodes during operations, limiting current flow to each of said pairs of electrodes to a value which will prevent conditions at one pair of electrodes from adversely affecting sparking conditions at the other pairs, and varying the voltage at each pair of electrodes in accordance with the pressure conditions prevailing in the respective cylinders.

31. In the operation of an internal combustion engine having a plurality of cylinders, a reciprocable piston in each cylinder, an ignition chamber communicating with each cylinder, and a pair of electrodes in each ignition chamber and spaced from the communicating cylinder, the steps comprising providing and maintaining during each cycle a continuous series of sparks between each pair of electrodes, and limiting the current flow to each pair of electrodes so as to prevent sparking conditions at one pair of electrodes from adversely affecting sparking conditions at the other pairs, said sparks at each pair of electrodes being provided by a common high potential source and the current supplied thereby being divided substantially equally between said pairs of electrodes.

32. In the operation of an internal combustion engine having a plurality of cylinders, a reciprocable piston in each cylinder, an ignition chamber communicating with each cylinder, and a pair of electrodes in each ignition chamber and spaced from the communicating cylinder, the steps comprising providing and maintaining during substantially all of each cycle a continuous series of sparks between each pair of electrodes, said sparks at a plurality of said pairs of electrodes being provided by a common source of high potential current, limiting the current flow to each pair of electrodes by dividing the current supplied by said common source among the several pairs of electrodes and thereby increasing substantially the voltage and power at each pair of electrodes in accordance with the increase in pressure in each cylinder and ignition chamber due to reciprocation of the piston.

33. In the operation of an internal combustion engine having a plurality of cylinders, a reciprocable piston in each cylinder, an ignition chamber communicating with each cylinder, and a pair of electrodes in each ignition chamber and spaced from the communicating cylinder, the steps comprising providing a continuous series of current impulses of high potential from a common power source, limiting the current flow from said common power source to each of said pairs of electrodes to a value which will prevent sparking conditions at one pair from adversely affecting sparking conditions at another pair, maintaining a continuous series of sparks simultaneously at a plurality of said pairs of electrodes and increasing the voltage at each pair of electrodes in accordance with the increase in pressure in each cylinder and ignition chamber.

34. In the operation of an internal combustion engine having a plurality of cylinders, a reciprocable piston in each cylinder, an ignition chamber communicating with each cylinder beyond the end of the stroke of the piston therein, and a pair of spark electrodes in each ignition chamber and spaced from the point of communication between the cylinder and the ignition chamber, the steps comprising continuously providing and maintaining during operations a series of high frequency and high voltage current impulses at a plurality of pairs of electrodes from a common source of high potential current, whereby a continuous sparking condition is provided at each of said pairs of electrodes, the current supplied to each of said pairs of electrodes being limited to a value which will prevent conditions at one pair of electrodes from adversely affecting sparking conditions at the other pairs, feeding an ignitable fuel mixture to each of said cylinders and ignition chambers at spaced time intervals, compressing the mixture in each cylinder and ignition chamber, and burning the mixture in each cylinder approximately when the maximum compression pressure is achieved therein, the voltage and power at each pair of electrodes being substantially increased as the adjacent pressure increases due to the compression of the fuel mixture.

35. In the operation of an internal combustion engine having a plurality of cylinders, a reciprocable piston in each cylinder, an ignition chamber communicating with each cylinder beyond the end of the stroke of the piston therein, a pair of spark electrodes in each ignition chamber and spaced from the point of communication between the cylinder and the ignition chamber and a single source of high potential current for a plurality of said pairs of electrodes, the steps comprising providing and maintaining during operations a continuous series of sparks between each pair of electrodes, limiting the current flow to each of said pairs of electrodes to prevent sparking conditions at one pair from adversely affecting sparking conditions at other pairs thereof, filling each of said cylinders and ignition chambers with a combustible mixture of substantially uniform richness, compressing the mixture in each cylinder and ignition chamber by reciprocation of said pistons, maintaining a pressure differential in each of said cylinders and the respective ignition chambers during the compression stroke of the piston, and retarding the ignition of the mixture in each cylinder, until the piston therein is approximately at the end of the compression stroke, by the pressures created in the cylinder by the piston and by the flow of the combustible mixture into the ignition chamber.

36. In the operation of an internal combustion engine having a plurality of cylinders, a reciprocable piston in each cylinder, an ignition chamber communicating with each cylinder beyond the end of the stroke of the piston therein, a pair of spark electrodes in each ignition chamber and spaced from the point of communication between the cylinder and the ignition chamber and a single source of high potential current for a plurality of said pairs of electrodes, the steps comprising providing and maintaining during operations a continuous series of sparks between each pair of electrodes, limiting the current flow to each of said pairs of electrodes to prevent sparking conditions at one pair from adversely affecting sparking conditions at the other pairs, filling each of said cylinders and ignition chambers with a combustible mixture of substantially uniform richness, compressing the mixture in each cylinder and ignition chamber by reciprocation of said pistons, providing a variable amount of voltage at each pair of electrodes, and controlling the burning of the mixture in each cylinder so that it takes place approximately when the piston is adjacent the end of its compression stroke by retarding the movement of the flame front from each ignition chamber into each cylinder by the pressure created in each cylinder by the compression of the mixture therein.

37. In the operation of an internal combustion engine having a plurality of cylinders, an ignition chamber communicating with each cylinder, a single source of high potential current and a pair of electrodes in each ignition chamber and spaced from the communicating cylinder, the steps comprising providing and maintaining during operations a continuous series of current impulses of high potential and high frequency at each pair of electrodes, limiting the current flow at each of said pairs of electrodes to a sufficient extent to prevent sparking conditions at one pair from adversely affecting sparking conditions at said other pairs, and varying the voltage and power at each pair of electrodes in accordance with the pressure conditions prevailing in the cylinders, ignition occurring when the pressure conditions in the ignition chamber exceed the pressure conditions in the cylinder, the voltage and power of each spark reaching a maximum when maximum pressure conditions are achieved in the ignition chamber.

38. In the operation of an internal combustion engine having a plurality of cylinders, an ignition chamber communicating with each cylinder and a pair of electrodes in each ignition chamber and spaced from the communicating cylinder, the steps comprising supplying from a single power source a continuous series of current impulses of high frequency and high and variable voltage for each pair of electrodes and at the same time limiting the current to each pair of electrodes to a value sufficient to prevent sparking conditions at one pair of electrodes from adversely affecting sparking conditions at said other pairs.

References Cited in the file of this patent

UNITED STATES PATENTS

| | | |
|---|---|---|
| 1,393,636 | Murray | Oct. 11, 1921 |
| 2,227,714 | Holthouse | Jan. 7, 1941 |
| 2,436,905 | Short | Mar. 2, 1948 |

FOREIGN PATENTS

| | | |
|---|---|---|
| 464,179 | Great Britain | Apr. 13, 1937 |
| 466,694 | Great Britain | June 2, 1937 |